United States Patent Office 3,095,851
Patented July 2, 1963

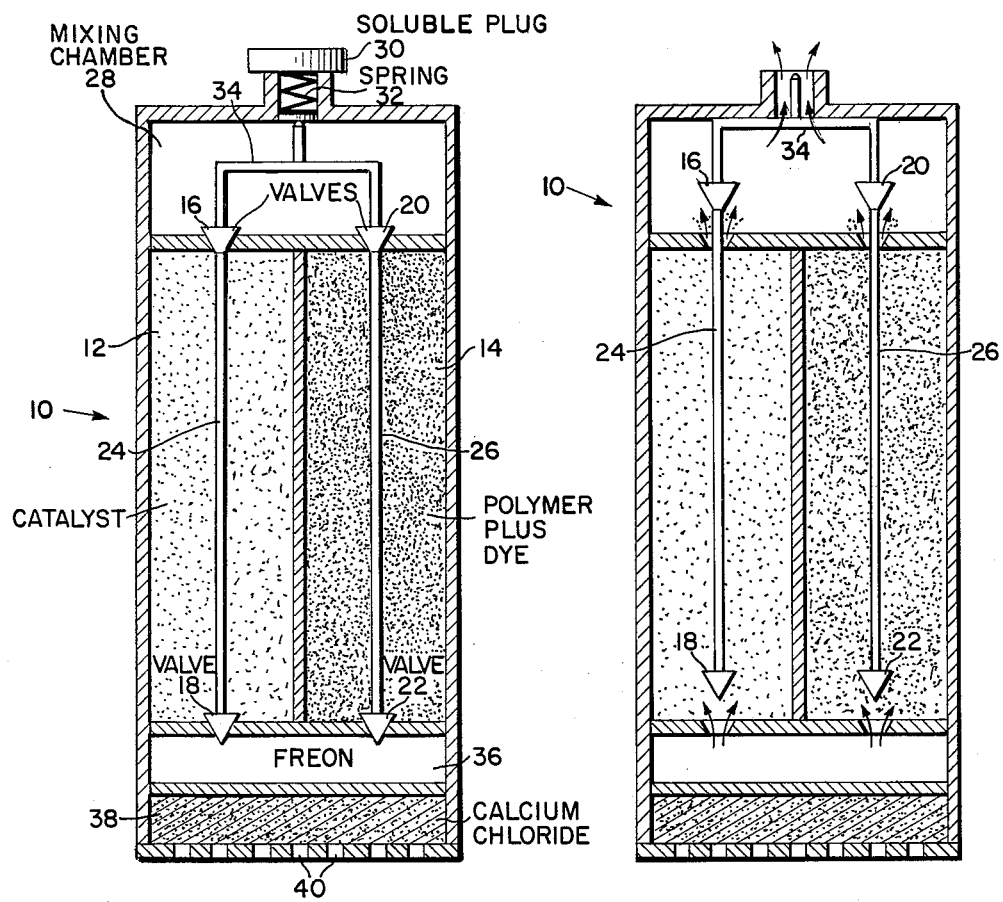

3,095,851
WATER MARKING DEVICE
Samuel E. Lager, P.O. Box 385, Somis, Calif.
Filed Nov. 27, 1961, Ser. No. 155,218
11 Claims. (Cl. 116—124)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and means for marking the location of an object which is either floating in, or submerged below the surface of, a body of water. More specifically, the invention relates in one of its aspects to a device which can be released by an aircraft so as to impact the surface of the water in the general vicinity of the object to be recovered, which device will then act to emit a chemical substance which possesses the property of phosphorescence as a result of which it is readily "spotted" by an observer and the recovery of the nearby object facilitated.

In accordance with an important feature of the present invention, a marker is provided which continues for an indefinite period of time to "pinpoint" the location of an object in its immediate vicinity. In a preferred embodiment, this result is achieved by combining a number of ingredients which, when brought into contact with one another, form an insoluble cellular structure the outer surface of which is optically lenticular. Consequently, if one of the ingredients of the combination is a dye having fluorescent properties (such, for example, as sodium fluorescein) then the outer lenticular surface of the cellular body will produce a specular diffusion of the fluorescent material, or, expressed in other words, the range over which the marker is visible to an observer will be greatly increased with respect to one in which such optical diffusion is lacking.

One object of the present invention, therefore, is to provide an improved form of dye marker for locating objects which are either floating in a body of water or which are submerged below the surface thereof, and to a method of producing such a marker.

A further object of the invention is to provide a marking unit which is activated upon contact with a body of water to release thereinto an insoluble cellular substance the surface of which is optically lenticular.

An additional object of the invention is to incorporate into the cellular substance so formed a dye possessing a high degree of fluorescence, such dye being precluded from entering into solution with the water by being integrally combined with the cellular material itself.

Other objects and many of the attendant advantages of this invention will be readily appreciated as the same become better understood by referenue to the following detailed description when considered in connection with the accompanying drawings wherein:

FIG. 1 is a cross-sectional view of a preferred embodiment of the present invention, illustrated in its inactive condition; and FIG. 2 shows the device of FIG. 1 in active condition following its entry into a body of water.

Referring now to the drawings, there is shown in FIGS. 1 and 2 an assembly specifically designed to mark the location of an object which is either floating in, or submerged below the surface of, a body of water. The illustrated structure is in the form of a unitary container which is intended to be dropped from an aircraft so as to impact the surface of the water in the general vicinity of the object to be recovered. Following impact, the unit becomes effective (in a manner to be set forth below) to mark the location of the object in such a manner as to be readily detectable by a vessel which is seeking the object no matter how long a period of time may elapse before the vessel's arrival.

The structure of FIGS. 1 and 2 includes a cylindrical container generally identified by the reference numeral 10. The container 10 has therewithin two chambers 12 and 14 which are arranged side-by-side as shown to run generally longitudinally, or lengthwise, of the container. Each of the chambers 12 and 14 is adapted to be filled with a particular chemical substance, and it is essential that these substances remain out of contact with one another until such time as the unit is activated to initiate its function of marking the location of an object. Consequently, each of the chambers 12 and 14 is completely enclosed, with the chamber 12 being provided with a pair of valves 16 and 18 respectively closing openings 16a and 18a which are oppositely disposed longitudinally of the container. In similar fashion, chamber 14 has associated therewith a further pair of valves 20 and 22 which are oppositely disposed to respectively close openings 20a and 22a in a manner similar to that of the valves 16 and 18. As shown in the drawings, and for purposes which will later become apparent, the valves 16 and 18 are interconnected by a shaft 24 which lies parallel to the axis of the cylindrical container 10, while the valves 20 and 22 are similarly interconnected by a shaft 26 which is parallel both to this axis and to the valve shaft 24. Expressed differently, the valves 16 and 18 are ganged together for concurrent operation, as are the valves 20 and 22.

At one end of the container 10 (considered lengthwise) is a further chamber 28 which is separated from the chamber 12 by the valve 16 and from the chamber 14 by the valve 20. An exterior opening in this chamber 28 is closed by a plug 30 which is composed of some material soluble in water (such, for example, as Polyox, Lemoflex, Methocel, or PVA) so that, when the invention device is released from an aircraft, the chamber 28 of container 10 will have unrestricted access (following disintegration of plug 30) to the fluid in which the container becomes submerged. Beneath the soluble plug 30 is positioned a spring, or resilient member, 32 which rests upon a washer 33. Spring 32 is held in place by the plug and acts through a mechanical linkage 34 consisting of an inverted U-shaped rod element 35 and a vertically-extending stud 35a which contacts the washer 33 to maintain the valves 16 and 20 in closed position (as shown in FIG. 1) as long as the plug 30 seals chamber 28 in a manner illustrated. Inasmuch as valves 18 and 22 are also closed when their companion valves 16 and 20, respectively, are closed, it follows that when the container 10 is in its inactive position, the linkage 34, together with shafts 24 and 26, maintain all of the valves 16, 18, 20 and 22 closed as a result of the biasing action of spring 32.

When the invention device is made ready for use as a marker, the chamber 14 is filled with some polymer such as polyurethane, with which has been mixed a dye such, for example, as sodium fluorescein. The dye is selected particularly for its property of producing visible fluorescence even when it is present in a extremely thin film. Although the polyurethane which fills the chamber 14 is in a fluid state, it is not necessary that it be pressurized for reasons which will subsequently appear.

The chamber 12 is filled with a fluid catalyst such, for example, as tolyl di-isocyanate. This catalyst is capable of mixing with the polyurethane contained in chamber 14 to form a foam-like material which is essentially insoluble in water. To bring these chemical substances together, they are ejected concurrently into the chamber 28, in which they are mixed prior to being forced through the opening which had previously been closed by the soluble plug 30.

In order to carry out the process set forth above, the container 10 is provided with a further chamber 36 disposed on the opposite end of the container from the chamber 28. This chamber 36 extends laterally across the container and contains some suitable propellant which possesses the property of expanding in volume when heated. One example of such a propellant is the material commonly known as Freon. In order to raise the temperature of the Freon and thereby bring about its expansion, the outer end wall of the chamber 36 is in contact wtih a still further chamber 38 filled with a water-reactive exothermic substance such as calcium chloride. As illustrated, the outer end wall of chamber 38 has formed therein a plurality of apertures 40 of such size as to admit water therethrough into the chamber 38 so that the water contacts the calcium chloride filling such chamber. The resulting exothermic reaction raises the temperature of the wall between chambers 36 and 38 and heats the Freon (or other propellant) such that the pressure within chamber 36 rises.

Concurrently with this pressurization of the Freon-filled chamber 36, the plug 30 is gradually disintegrating as a result of its contact with the water in which the unit has been dropped. The fabrication of the plug 30 is such that it is timed to completely disintegrate at a point when the material in chamber 36 has attained sufficient pressure to act as a propellant.

As soon as plug 30 dissolves, spring 32 is no longer restrained in position, and the pressure of the propellant in chamber 36 forces valves 18 and 22 open. At the same time, movement of rods 24 and 26 forces their respective valves 16 and 20 open and ejects the spring 32 and washer 33 through the exterior opening formerly closed by the plung 30. Action of the propellant passing through the opening formerly closed by valve 18 causes the catalyst in chamber 12 to pass into the chamber 28 through the opening formerly closed by valve 16. In similar fashion, the propellant passing through the opening formerly closed by valve 22 causes the polyurethane in chamber 14 to also pass into the chamber 28 through the opening formerly closed by the valve 20. In other words, the valve elements have now assumed positions such as shown in FIG. 2, which is the operating condition of the device.

The polyurethane thus mixes with the catalyst in chamber 28 and, due to the continued pressure of the propellant in chamber 36, this mixture is ejected through the opening in the container formerly closed by plug 30. Since the mixture has a specific gravity less than that of water, it rises to the surfaces. Furthermore, the mixture remains in solid cohesive form, such that continued emission from container 10 creates a "mattress" of foam on the water surface. Since the material is insoluble, it has an indefinite life, and, since the amount of material which may be contained within the device is not subject to any limitation except that imposed by the practicable size of the assembly, a "mattress" of large surface area may be produced which renders the object to be recovered much more readily detectable by those carrying out the recovery operations.

It has been found that the sighting of such material is greatly facilitated by the presence therein of the sodium fluorescein dye. This substance exhibits a high degree of fluorescence, and, since the surface of the foam "mattress" formed in the manner just described is essentially lenticular, the dye acts to, in effect, create a large number of minute lenses which serve to diffuse incident light to an observer. Since the substance produced is completely insoluble in water, the sodium fluorescein (or other dye preferably of the resorcinolphthalein type) employed to increase its visibility will not gradually be dissipated by dissolving into the water, as has been a major drawback in many previous proposals along this general line.

Although certain specific chemical substances have been mentioned as being particularly suitable for use in producing the "mattress" of the invention, it is apparent that other ingredients (such as nitrocellulose) may be substituted for the polyurethane as long as the resulting product remains insoluble and is capable of having evenly diffused therethrough some coloring material which serves to render the product highly visible under even poor atmospheric conditions. Furthermore, although calcium chloride has been specifically mentioned as being a preferred example of a chemical which will react with water to generate sufficient heat to expand the propellant, it is clear that other materials which will similarly react may be employed as long as the process is an exothermic one. Still further, other propellants than Freon may be utilized for reasons such as availability or lower cost.

Obviously many modifications and variations of the present invention are possible in the light of the above teachings. It is, therefore, to be understood that, within the scope of the appended claims, the invention may be practiced otherwise than as specifically described.

I claim:

1. A device for marking the location of an object in a body of water, said device being adapted for entry into said body of water in the vicinity of the object the location of which is to be marked thereby, said device comprising an elongated container having a pair of laterally-adjacent compartments extending longitudinally of said container for less than the entire length thereof, one of said compartments being filled with an insoluble polymer to which has been added a coloring material, the other of said compartments being filled with a fluid catalyst, said device further comprising a mixing chamber located at one longitudinal extremity thereof so as to border upon both of said compartments, a soluble plug closing an exterior opening in said mixing chamber, means operating upon a dissolution of said plug following entry of said device into a body of water for opening said mixing chamber to the respective fluids contained in said two compartments, and means for propelling such respective fluids into said mixing chamber where they combine to form a marking substance, said propelling means further acting to force the marking substance so formed through the exterior opening in said mixing chamber formerly closed by said plug.

2. The combination of claim 1 in which said insoluble polymer is polyurethane.

3. The combination of claim 1 in which said coloring material is sodium fluorescein.

4. The combination of claim 1 in which said fluid catalyst is tolyl di-isocyanate.

5. The combination of claim 1 in which said means for propelling the respective fluids in said compartments into said mixing chamber comprises means for introducing a gas under pressure into each of said compartments concurrently with the opening of the mixing chamber to the respective fluids contained in said compartments.

6. The combination of claim 5 in which said gas is Freon.

7. A device for marking the location of an object in a body of water, said device being adapted for entry into said body of water in the vicinity of the object the location of which is to be marked thereby, said device comprising an elongated container having a pair of laterally-adjacent compartments extending longitudinally of said container for less than the entire length thereof, one of said compartments being filled with an insoluble polymer to which has been added a coloring material, the other of said compartments being filled with a fluid catalyst, said device further comprising a mixing chamber located at one longitudinal extremity thereof so as to border upon both of said compartments, a soluble plug closing an exterior opening in said mixing chamber, means operating upon a dissolution of said plug following entry of said device into a body of water for opening said mixing chamber to the respective fluids contained in said two compartments, said device further comprising a propellant chamber located adjacent said two compartments and longitudinally opposite said mixing chamber, means, associated with the means operating upon a dissolution of said plug to open said mixing chamber to the respective fluids contained in said two compartments, for opening said two compartments to said propellant chamber, and a propellant contained in said propellant chamber.

8. The combination of claim 7, further comprising means for causing said propellant to enter said two compartments following the opening thereof to said propellant chamber.

9. The combination of claim 8, in which said propellant has the property of expanding in volume when heated, and in which the means for causing said propellant to enter said two compartments following the opening thereof to said propellant chamber comprises means for raising the temperature of said propellant.

10. The combination of claim 9 in which the means for raising the temperature of said propellant comprises an additional heating chamber for said device adjacent said propellant chamber, said heating chamber being apertured so as to admit water thereinto when said device is operative, and a water-reactive substance filling said heating chamber, said water-reactive substance being capable of emitting heat as a product of such reaction.

11. The combination of claim 10 in which said water-reactive substance is calcium chloride.

References Cited in the file of this patent

UNITED STATES PATENTS

| | | |
|---|---|---|
| 2,346,325 | Oliver | Apr. 11, 1944 |
| 2,459,267 | Dwyer et al. | Jan. 18, 1949 |
| 2,876,935 | Lindberg | Mar. 10, 1959 |